US005682852A

United States Patent [19]

Gutkin

[11] Patent Number: 5,682,852

[45] Date of Patent: *Nov. 4, 1997

[54] INTERNAL COMBUSTION ENGINE

[76] Inventor: Timofei Gutkin, 1420 Ocean Pkwy., #§6E, Brooklyn, N.Y. 11230

[ * ] Notice: The term of this patent shall not extend beyond the expiration date of Pat. No. 5,537,957.

[21] Appl. No.: 592,839

[22] Filed: Jan. 22, 1996

Related U.S. Application Data

[63] Continuation-in-part of Ser. No. 439,312, May 11, 1995, Pat. No. 5,537,957, which is a continuation-in-part of Ser. No. 168,419, Dec. 17, 1993, abandoned.

[51] Int. Cl.[6] .......... F16H 21/34

[52] U.S. Cl. .......... 123/197.1; 123/55.2

[58] Field of Search .......... 123/197.1, 197.3, 123/197.4, 53.1, 53.3, 53.5, 55.2, 52.1, 58.1, 65 R, 311

[56] References Cited

U.S. PATENT DOCUMENTS

| | | | |
|---|---|---|---|
| 1,340,651 | 5/1920 | Dietrich | 123/53.3 |
| 1,912,604 | 6/1933 | Valentine | 123/53.1 |
| 2,392,921 | 1/1946 | Holman | 123/197.4 |
| 2,822,791 | 2/1958 | Biermann | 123/197.4 |
| 3,633,429 | 1/1972 | Olson | 123/197.3 |
| 3,693,463 | 9/1972 | Garman | 123/197.3 |
| 4,433,649 | 2/1984 | Shin | 123/197.5 |
| 4,437,438 | 3/1984 | Mederer | 123/197.3 |
| 4,979,428 | 12/1990 | Nelson | 123/197.4 |
| 5,211,065 | 5/1993 | Mandella | 123/197.4 |
| 5,216,927 | 6/1993 | Mandella | 123/197.4 |

*Primary Examiner*—David A. Okonsky
*Attorney, Agent, or Firm*—I. Zborovsky

[57] ABSTRACT

An internal combustion engine has a rotatable work shaft, a rotatable crank connected with the work shaft, a plurality of cylinders having working chambers, a plurality of pistons movable in the cylinders, and connecting means connecting the pistons with the crank so that a maximum compression pressure in the respective cylinders is transmitted to the crank and a maximum lever arm of the crank is simultaneously obtained, the crank includes at least two crank members located one above the other.

8 Claims, 5 Drawing Sheets

INTERNAL COMBUSTION ENGINE

CROSS-REFERENCES TO RELATED APPLICATIONS

This application is a continuation-in-part of application Ser. No. 439,312, filed on May 11, 1995 and now U.S. Pat. No. 5,537,957 which in turn is a continuation-in-part of application Ser. No. 168,419, filed Dec. 17, 1993 now abandoned.

BACKGROUND OF THE INVENTION

The present invention relates to internal combustion engines for conversion of thermal energy into mechanical energy of a rotary work shaft.

Internal combustion engines in which the thermal energy generated during combustion of fuel is converted into the mechanical energy of rotational work shaft with the use of a rectilinear movement of a piston in a cylinder and a crank mechanism connected with it. In known internal combustion engines, at the moment of maximum pressure of hot gases, the piston with the crank mechanism is located in the upper dead point. In this position at the maximum temperature of hot gases, there is no conversion of heat energy into mechanical energy of movement in the combustion chamber since the lever arm of the crankshaft is equal to zero and therefore the torque on the work shaft is equal to zero. At this moment there is the maximum jump of temperature between hot gas in the combustion chamber and a cylinder block surrounding the same. A substantial part of the thermal energy is transmitted to the cylinder block and is discharged into atmosphere through water cooling. This causes low energy efficiency of known internal combustion engines.

This can be also proven from the thermodynamic point of view since in the above described case the polytrope is far from an ideal one, and the area inside the polytrope is small. In other words, the useful energy taken for the mechanical movement is low. After this, when the crankshaft turns by 90° and the lever arm becomes maximal, the gas pressure above the piston is small as compared with the maximum pressure and as a result the torque is also small. Therefore, in the known system with the high gas pressure applied to the piston there is no substantial lever arm, and when there is a lever arm the gas pressure applied to the piston is small. In such a system the conversion of thermal energy into mechanical energy of rotation of work shaft is carried out inefficiently. In this system at the moment of fuel combustion the piston with the crankshaft is in the upper dead point, the lever arm is equal to zero, the torque of the shaft is equal to zero, and the total pressure applied to the piston is used for impact through the pin and the connecting rod against the crankshaft and to the bearings which support the connecting rod and the connecting shaft. The utilization of high pressure P2 in this case requires stronger moveable parts of the engine, greater bearings, crankshaft and therefore the increase of size and weight of the engine as a whole. This in turn leads to heavier engines and worsening of its compact construction. In order to reduce the impact against the bearings of a crankshaft to some extent it is necessary to shift the time between the position of the piston in the upper dead point and the moment of fuel combustion (delay) in order to produce a torque of the work shaft which is not equal to zero. However, it does not provide a substantial improvement. This leads to additional energy losses, which reduces energy efficiency of the engine.

The above mentioned disadvantages are eliminated in my internal combustion engine described in the U.S. patent application Ser. No. 08/439,312 and now U.S. Pat. No. 5,537,957, filed on May 11, 1995. In this internal combustion engine, the pressure of hot gases against the piston of the internal combustion engine is transmitted to the work shaft of the engine an the moment when maximum compression in the combustion chamber coincides with maximum lever arm of the crank, so that a maximum torque is provided on the work shaft. The construction disclosed in my above identified patent application can be further improved.

SUMMARY OF THE INVENTION

Accordingly, it is an object of the present invention to further improve the internal combustion engine in which the maximum compression in the compression chamber coincides with the maximum lever arm of the crank.

In keeping with these objects and with others which will become apparent hereinafter, one feature of the present invention resides, briefly stated, in an internal combustion engine having a rotatable work shaft, a rotatable crank connected with the work shaft, a plurality of cylinders having working chambers, a plurality of pistons movable in the cylinders, and connecting means connecting the pistons with the crank so that a maximum compression pressure in the respective cylinders is transmitted to the crank and a maximum lever arm of the crank is simultaneously obtained, the crank includes at least two crank members located one above the other.

When the internal combustion engine is designed in accordance with the present invention it has a simpler construction, contains less parts, and is more efficient.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF THE PREFERRED EMBODIMENTS

The present invention is illustrated as an example of a two-stroke internal combustion engine.

Figure 1:
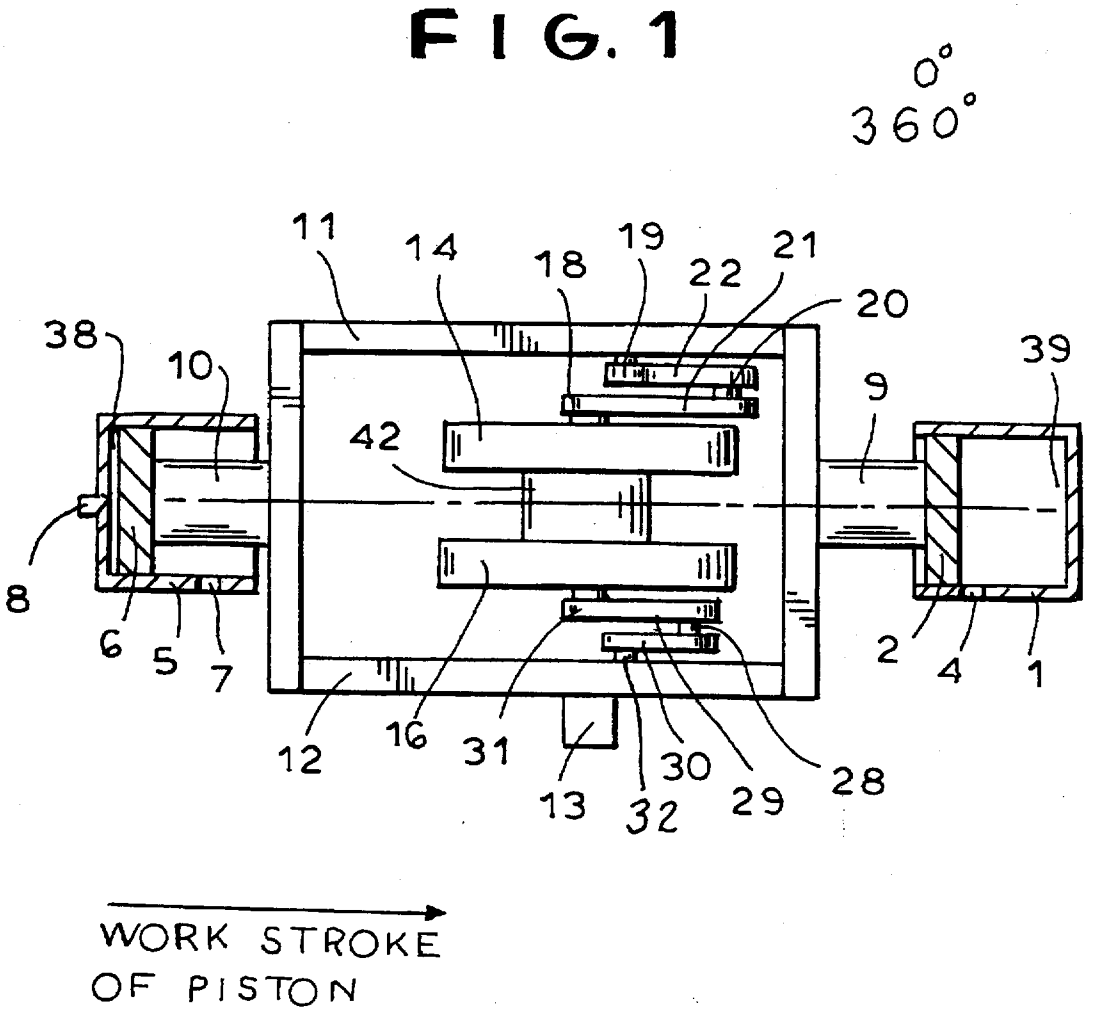
FIG. 1 is a schematic plan view of an internal combustion engine in accordance with the present invention.

As can be seen from FIG. 1, at the right side, a cylinder 1 has a piston 2. A nozzle 3 for injection of fuel is arranged in the cover of the cylinder 1 and a window 4 is provided for expulsion of exhaust gases and intake of air. At the left side of FIG. 1, a second cylinder 4 with a piston 6 is shown. A nozzle 8 is arranged on the cover of the cylinder 5 for injection of fuel and a window 7 is provided for expulsion of exhaust gases and intake of air. The work pistons 2 and 6 are connected with one another by rigid stocks 9 and 10 and traction rods 11 and 12 so that the pistons 2 and 6 are arranged correspondingly in the cylinders 1 and 5 and form a double-acting piston. The stocks 9 and 10 are rigidly connected with the traction rods 11 and 12. Gears 14, 15, 16, 17 are located between the traction rods 11 and 12. The gears 14 and 16 are rigidly connected with one another by a single axis, while the gears 15 and 17 are also rigidly connected with one another by another axle. The gear 14 is connected through a gear transmission with the gear 15 while the gear 16 is connected through a gear transmission with the gear 17. In turn, the gear 15 is connected through the gear transmission with a gear 40, and correspondingly, the gear 17 is connected through a gear transmission with a gear 41. The gears 40 and 41 are arranged on a work shaft 13 and rigidly connected with another by the work shaft. Thus, all six gears are connected with one another and rotate synchronously.

The gears 14, 15, 16, 17 are driving gears, while the gears 40 and 41 arranged on the work shaft are driven gears. The gear 14 which forms a crank is connected by connecting rods to the traction rod 11 above, while the gears 15 which forms another crank is connected through connecting rods with the traction rod 11 below. Correspondingly, the gear 16 which forms crank is connected through connecting rods with the traction rod 12 above, while the gear 17 which forms another crank is connects through connecting rods with the traction rod 12 below.

The upper traction rod 11 has a pin with a hinge 19 in its top region and a pin with a hinge 23 in its bottom region. The traction rod 12 has a pin with a hinge 32 in its top region and a pin with a hinge 36 in its bottom region. The hinge 19 provided on the traction rod 11 in the top region is connected with a trunion of the crank 18 arranged on the gear 14 through a pushing connecting rod 22 and a pulling connecting rod 21. The connecting rods 21 and 22 are connected with one another by hinge 20. A hinge 23 provided on the traction rod 11 is connected in the lower region with a trunion of the crank 27 arranged on the gear 15 through a pushing connecting rod 24 and a pulling connecting rod 26. The connecting rods 24 and 26 are connected with one another by a hinge 25. Correspondingly, a hinge 32 located on the traction rod 12 in the top region is connected with a trunion of the crank 31 arranged on the gear 16 through a pushing connecting rod 30 and a pulling connecting rod 29. The connecting rods 29 and 30 are connected with one another by a hinge 28. A hinge 36 provided on the traction rod 12 in the lower region is connected with a trunion of the crank 37 arranged on the gear 17 through a pushing connecting rod 34 and a pulling connecting rod 35. The connecting rods 34 and 35 are connected with one another by a hinge 35. The gears 14 and 16 rotate on a shaft 42, while the gears 15 and 17 rotate on a shaft 43.

The radii of the gears 14, 15, 16 and 17 are identical. The radii of the gears 40 and 41 arranged on the work shaft can have the same radius or several times smaller. The trunion of the cranks 18, 27, 31, 37 arranged correspondingly on the gears 14, 15, 16, 17 are offset relative to one another by 90° in direction of rotation of the gears.

The conversion of thermal energy into mechanical energy of a rotary movement of the work shaft in the above described internal combustion engine is performed in the following manner.

Figure 2A:
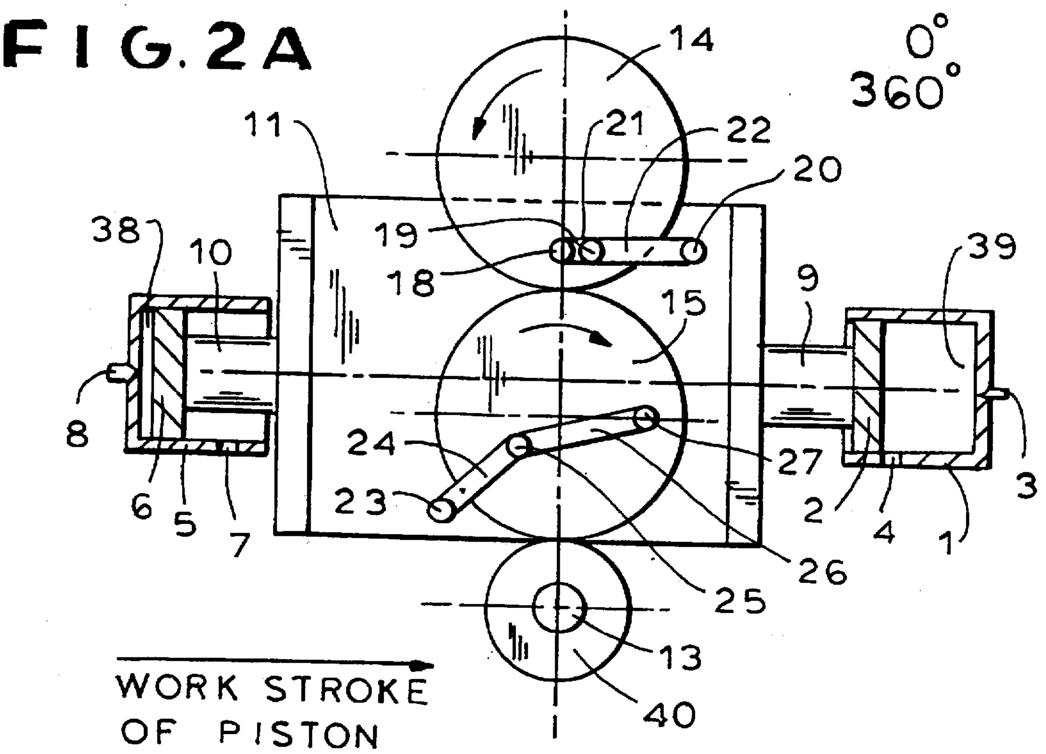
FIGS. 2a and 2b are side views of the internal combustion engine at a beginning of its first cycle and at an end of its fourth cycle, for first two cranks and for second two cranks correspondingly.
Figure 2B:
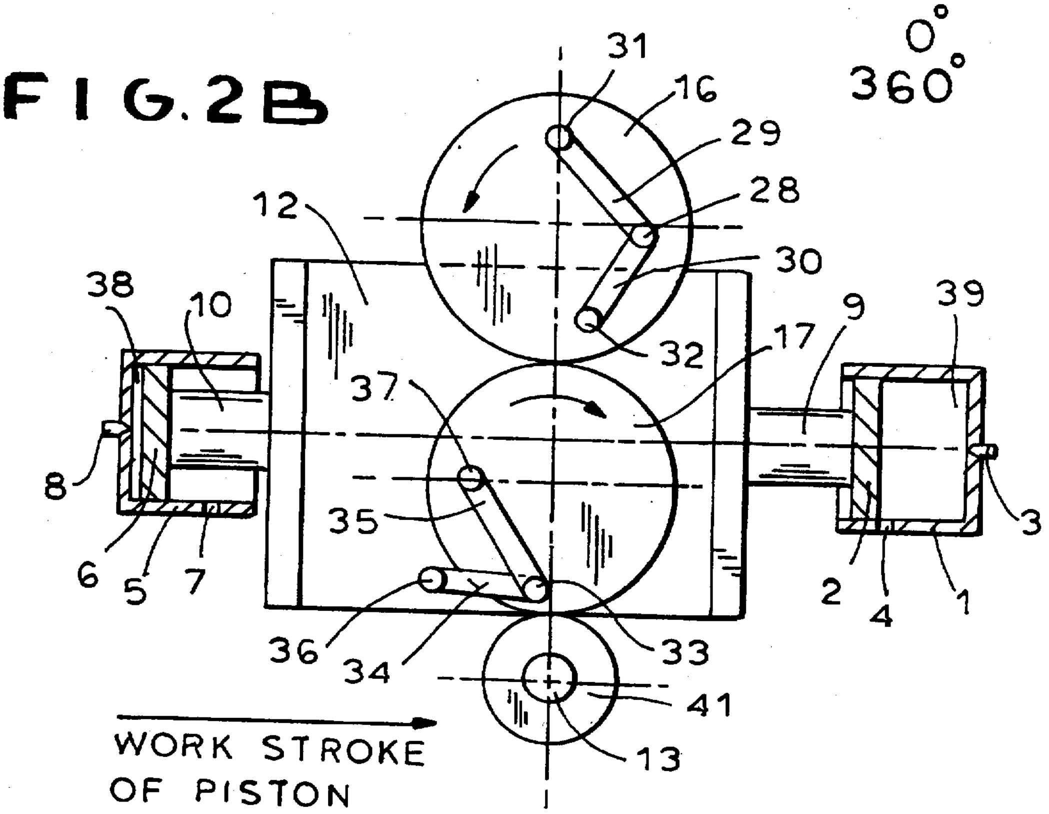
Figure 3A:
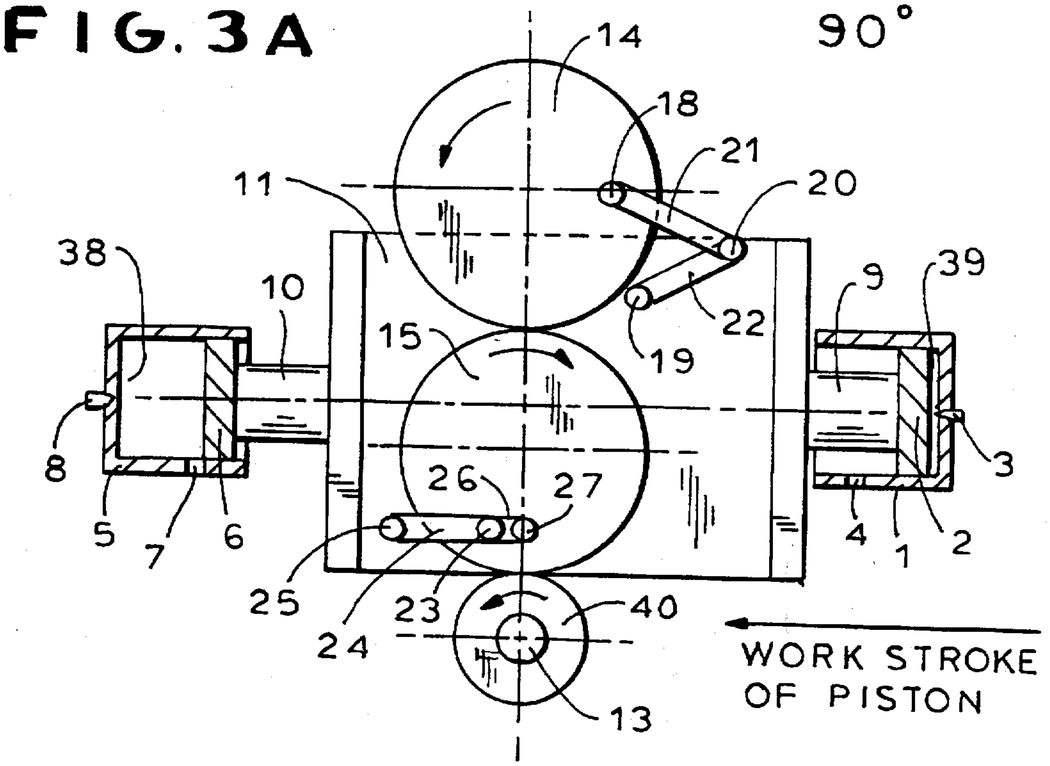
FIGS. 3a and 3b are side views of the internal combustion engine at a beginning of second cycle for first two cranks and for second two cranks correspondingly.
Figure 3B:
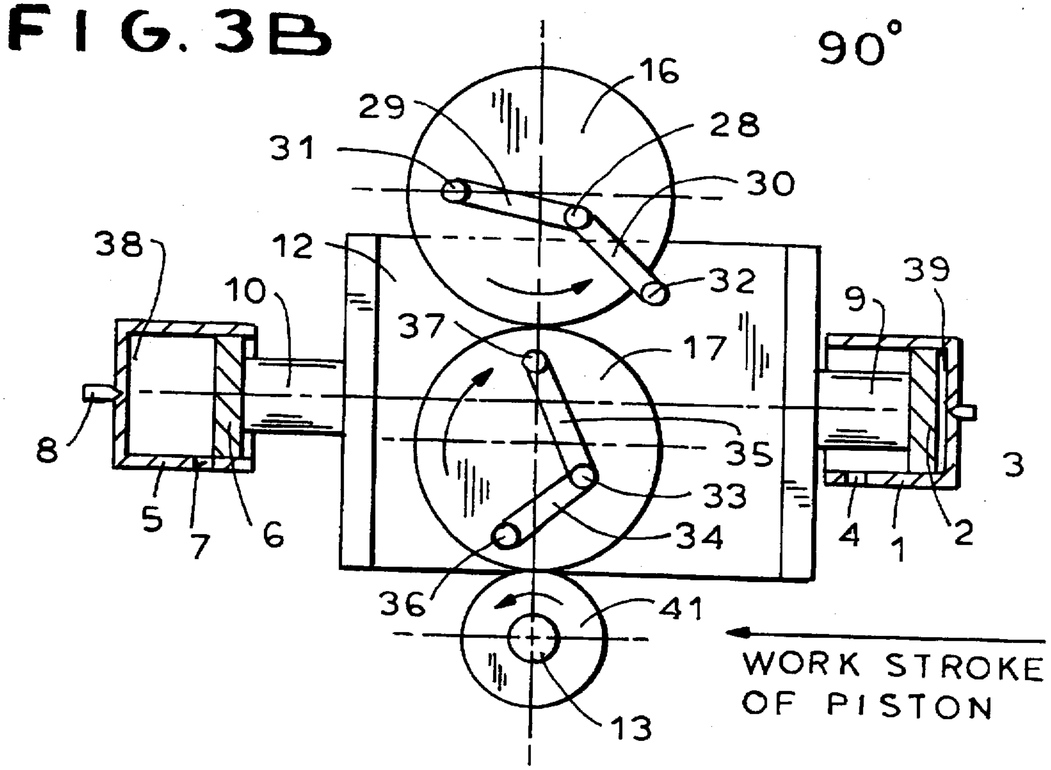

Cycle 1. During combustion of fuel in the combustion chamber 38 (see FIG. 2) in which preliminarily air was compressed, during rotation of the work shaft 13 from a not shown starter, a maximum pressure $P_z$ applied to the piston 6 is generated. Under the action of this pressure, the piston 6 starts its working stroke from the left to the right and through the stock 10 transmits a force to the fixedly connected traction rod 11 and simultaneously to the traction rod 12. As shown in FIG. 2, at this moment on the gear 14 the trunion of the crank 18 is located near the hinge 19 of the traction rod 11. The connecting rods 21 and 22 connected with the trunion of the crank 18 and the hinge 19 of the traction rod 11 are superposed and arranged along one horizontal straight line. The generated maximum pressure applied to the piston 6 is transmitted by the traction rod 11 through the hinge 19 and the connecting rods 21 and 22 connected with one another by a hinge 20, to the trunion of the crank 18. Therefore the pressure $P_z$ applied to the piston 6 is transmitted to the trunion of the crank 18 perpendicular to the radius of its rotation, or in other words when the lever arm of the crank has its maximum magnitude (or a distance from the center of the crank to its axis of rotation is maximal). The force is transmitted along a tangent to the circle, along which the trunion of the crank 18 moves. As a result, there is a combination of the simultaneous maximum pressure applied to the piston 6 and therefore the maximum force applied to the traction red 11, and as a result applied to the trunion of the crank 18, with the simultaneous maximum lever arm of the trunion of the crank 18. Thereby, optimal conditions are created for producing a maximum torque on the gear 14, which is transmitted to the gear 15 connected with it and correspondingly through the gear 40 to the work shaft 13. Simultaneously with expansion of hot gases in the chamber 38, air compression in the chamber 39 is performed through the stock 10, the traction rods 11 and 12, and through the stock 9 by the piston 2. The gears 14, 15, 16, 17 which have identical radii and are connected with one another and with the gears 40 and 41 are rotated synchronously. When the working stroke of the piston 6 ends, the gear 14 with the trunion of the crank 18 turns by 90°, and because of the synchronous rotation, all other gears 15, 16, 17 also turn by 90° as shown in FIG. 3. The stroke of the piston 6 is equal to the radius of rotation of the trunion of the crank 18. Therefore when the trunion of the crank 18 together with the gear 14 turns by 90° and the trunion of the crank 18 moves to the right by the radius of its rotation, the piston 6 will move from the left to the right also by the radius. All other connecting rods 24, 26, 29, 30, 35 perform preparatory cycles, and move freely so as not to interfere with the working stroke of the connecting rods 21 and 22. The connecting rods 24 and 26 connected with the trunion of the crank 27 arranged on the gear 15 turn together with the hinge 25 and will have a tendency to fold and be located on one horizontal straight line. When all cranks turn simultaneously by 90°, the trunion of the crank 27 is located near the hinge 23 of the traction rod 11. The connecting rods 24 and 26 are superposed in one straight line and are located along one horizontal straight line as shown in FIG. 3. Therefore favorable conditions are created for providing a maximum lever arm during action of a maximum force through the traction rod 11 on the hinge 23.

Cycle 2. At this moment of time, the compression of air in the chamber 39 ends. Air temperature increases so that during injection of fuel into the chamber 39 through the nozzle 3 a self-combustion of fuel occurs and the gas pressure sharply increases. The maximum pressure $P_z$ is generated on the piston 2. Under the action of this pressure, the working stroke of the piston 2 starts, and the system starts moving in an opposite direction from the right to the left. The maximum pressure of the piston 20 is transmitted through the stock 19 to the traction rod 11 connected with it and simultaneously to the traction rod 12. As shown in FIG. 3, at this moment on the gear 15 the trunion of the crank 27 is located underneath near the hinge 23 of the traction rod 11. The connecting reds 24 and 26 connected with the trunion of the crank 27 and hinge 23 of the traction rod 11 are superposed and extend along one horizontal straight line. The generated maximum pressure on the piston 2 is transmitted by the traction rod 11 through the hinge 23 and the connecting rods 24 and 26 connected with one another by the hinge 25 to the trunion of the crank 27. The pressure $P_z$ on the portion 2 is transmitted to the trunion of the crank 27 perpendicular to the radius of its rotation, or in other words when the lever arm of the crank has its maximum magnitude. The force is transmitted along a tangent to the circle along which the trunion of the crank 27 moves. As a result, there is a combination of the maximum pressure on the piston 2; and correspondingly maximum force on the traction rod 11 and as a result on the trunion of the crank 27, with simultaneous maximum lever arm of the trunion of the crank 27. Thereby optimal conditions are created for producing a maximum torque on the gear 15, which is transmitted to the gear 40 connected with it and correspondingly to the work shaft 13.

Figure 4A:
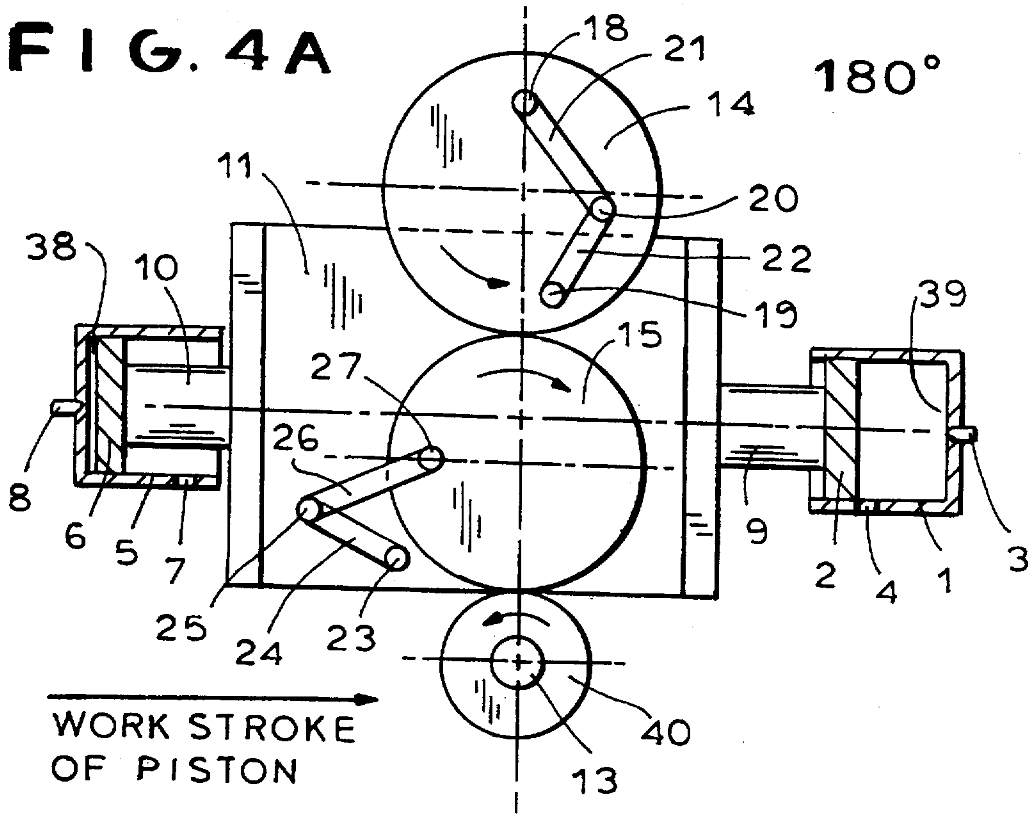
FIGS. 4a and 4b are views showing the internal combustion engine at the beginning of third cycle, for first two cranks and for second two cranks, correspondingly.
Figure 4B:
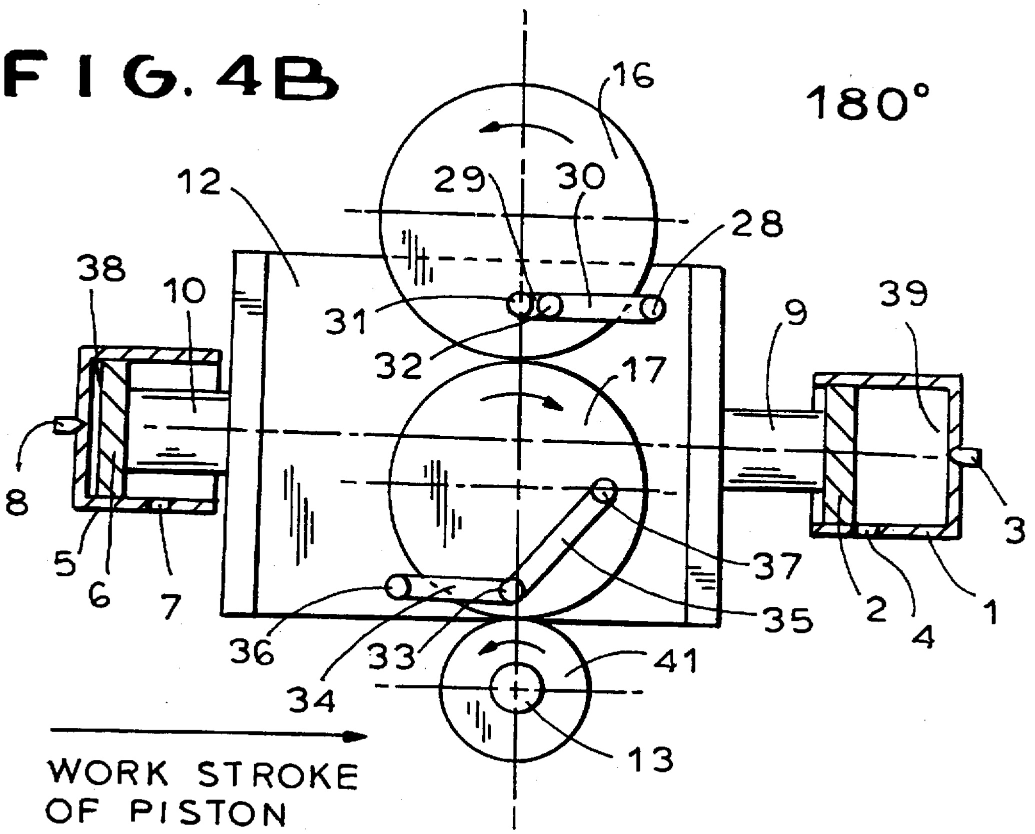

Simultaneously with expansion of hot gases in the chamber 39, compression of air in the chamber 38 is performed through the stock 9, the traction rods 11 and 12, the stock 10 by the piston 6. The gears 14, 15, 16, 17 which have identical radii and are connected with one another rotate synchronously. At the end of the working stroke of the piston 2, the gear 15 with the trunion of the crank 27 turns by 90° as shown in FIG. 4, and as a whole from the beginning of work and upon finishing of the cycle 2, all gears 14, 15, 16, 17 which rotate synchronously turn each by 180°. The gear 40 connected with them and correspondingly the work shaft 13 turn by an angle which is so many times greater is the ratio of the gears 14, 15, 16, 17 is greater relative to the gear 40.

Since the connecting rods are composed of two parts including a pushing connecting rod and a pulling connecting rod which are connected with one another by a hinge, during a working stroke of one pair of the connecting rods 24 and 26 the remaining connecting rods 21, 22, 29, 30, 34, 35 freely perform preparatory cycles. The connecting rods 29 and 30 connected with the trunion of the crank 31 turn together with the hinge 28 and tend to superpose and extend along one line. When all gears with the cranks simultaneously turn by 90°, the trunion of the crank 31 arranged on the gear 16 is located near the hinge 32 of the traction rod 12. The connecting rods 29 and 30 are superimposed and extend along one horizontal straight line as shown in PIG. 4. Thereby favorable conditions are created for producing a maximum lever arm with a simultaneous action of the maximum force through the traction rod 12 on the hinge 32.

Figure 5A:
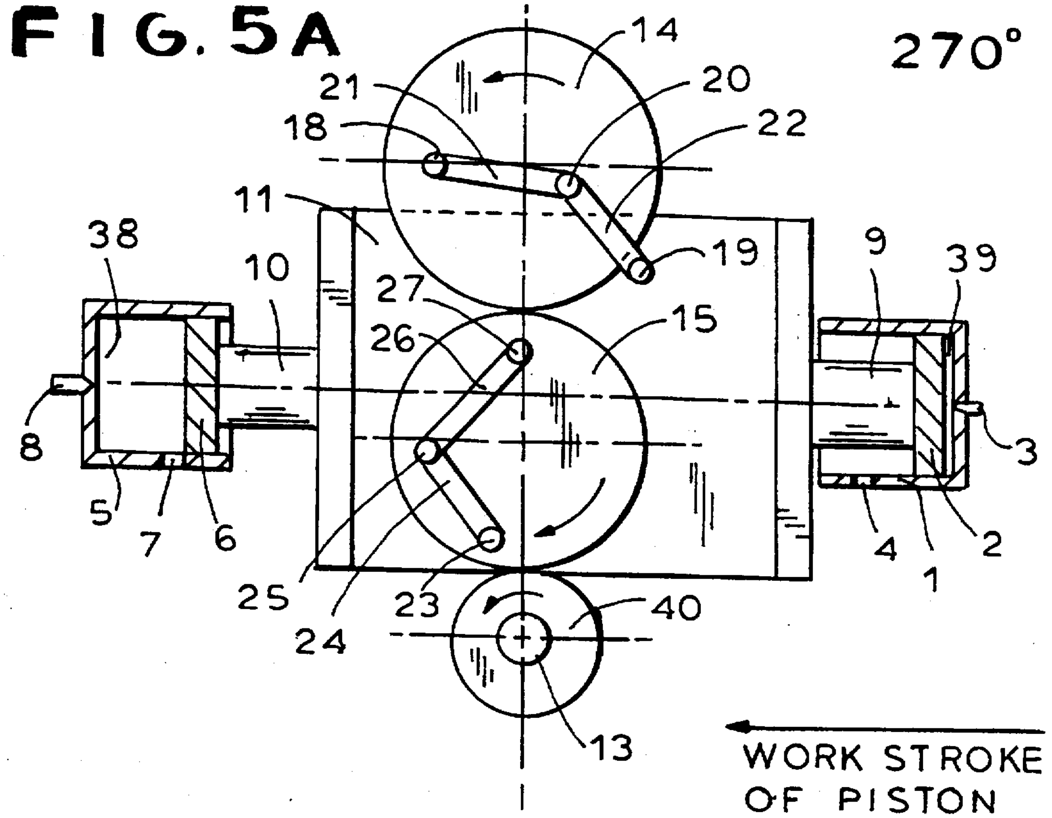
FIGS. 5a and 5b are views showing the internal combustion engine at the beginning of third cycle for first two cranks and for second two cranks, correspondingly.
Figure 5B:
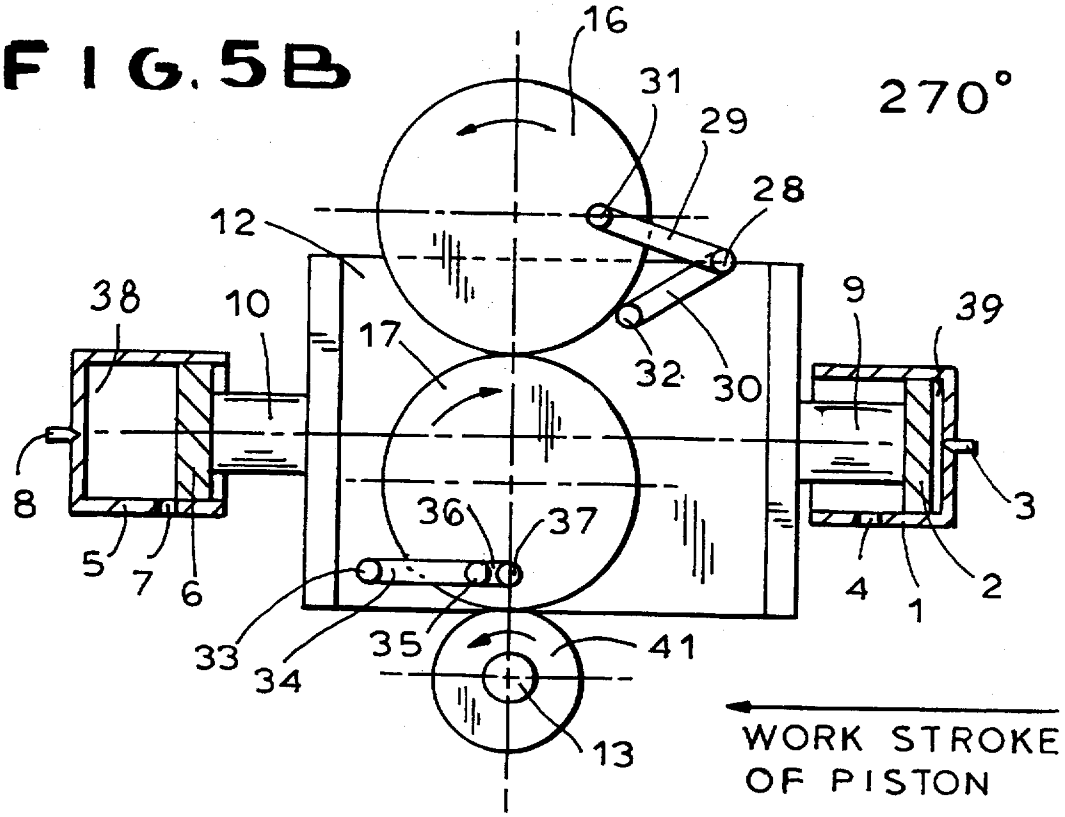

Cycle 3. At this moment the compression of air in the chamber 38 ends. The temperature increases so that during injection of fuel into the chamber 38 through the nozzle 8 self-firing of fuel occurs and the gas pressure sharply increases. A maximum pressure $P_z$ is formed on the piston 6. Under the action of this pressure working stroke of piston 6 starts in the opposite direction from the left to the right and through the stock 10 transmits the force to the fixedly connected traction rod 12 and simultaneously to the traction rod 11. As shown in FIG. 4 at this moment on the gear 16 the trunion of the crank 31 is located near the hinge 32 of the traction rod 12. The connecting rods 29 and 30 are connected with the trunion of the crank 31 and the hinge 32 of the traction rod 12, they are superposed and extend along one horizontal straight line. The generated maximum pressure on the piston 6 is transmitted by the traction rod 12 through the hinge 32 and the connecting rods 29 and 30 connected with one another by the hinge 28, to the pinion of the crank 31. The pressure $P_z$ on the piston 6 is transmitted to the trunion of the crank 31 perpendicular to the radius of its rotation or in other words when the lever arm of the crank has a maximum magnitude. The force is transmitted along the tangent to the circle along which the trunion 31 moves. As a result there is a combination of the maximum pressure on the piston 6 and correspondingly the maximum force on the traction rod 12, and as a result on the trunion 31, with the maximal lever arm of the crank 31. Therefore optimal conditions are created for producing the maximum torque on the gear 16, which is transmitted to the gear 17 connected with it and through the gear 41 correspondingly to the work shaft 13. Simultaneously with expansion of hot gases in the chamber 38, the air compression is performed in the chamber 39 through the stock 10, the traction rods 11 and 12, through the stock 9 by the piston 2. The gears 14, 15, 16, 17 have identical radii and are connected with one another, and they rotate synchronously. At the end of the working stroke of the piston 6, the gear 16 with the trunion of the crank 31 turns by 90° as shown in FIG. 5 and as a whole from the beginning of the work at the end of the cycle 3 all gears 14, 15, 16 and 17 which rotate synchronously turn each by 270°. The gear 16 connected through the gear 17 with the gear 41 turns by the angle which is as many times greater as the ratio of the gears 14, 15, 16 and 17 is greater relative to the gear 41. Since the connecting rods are composed of two parts, in particular a pushing connecting rod and a pulling connecting rod, and are connected with one another by the hinge, therefore during the working stroke of one pair of the connecting rods 29 and 30 the remaining connecting rods 21, 22, 24, 26, 34, 35 freely perform preparatory cycles. The connecting rods 34 and 35 connected with the trunion of the crank 36 on the gear 17 turn together with the hinge 33 and tend to superimpose and be located in one line. When all gears with the cranks are simultaneously turned by 90°, the trunion of the crank 37 of the gear 17 is located near the hinge 36 of the traction rod 12. The connecting rod 34 and 35 superimpose and are located along one horizontal straight line as shown in FIG. 5. Therefore favorable conditions are created for producing the maximum lever arm with the action of maximum force through the traction rod 12 on the hinge 36.

Cycle 4. At this moment the compression of air ends in the chamber 39. The air temperature increases so that during injection of fuel into the chamber 39 through the nozzle 3 self-firing of fuel occurs and the gas pressure sharply increases. The maximum pressure $P_z$ is formed above the piston 2. Under the action of this pressure the working stroke of the piston 2 starts in the opposite direction from the right to the left, and through the stock 9 transmits force to the fixedly connected traction rod 12 and simultaneously to the traction rod 11. As shown in FIG. 5, at this moment on the gear 17 the trunion of the crank 37 is located near the hinge 36 of the traction rod 12. The connecting rod 34 and 35 connected with the trunion of the crank 37 and hinge 36 of the traction rod 12 are superposed and located along one horizontal straight line. The produced maximum pressure on the piston 2 is transmitted by the traction rod 12 through the hinge 36 and the connecting rods 34 and 35 connect with one another by the hinge 33 to the trunion of the crank 37 of the gear 17. The pressure $P_z$ on the piston 2 is transmitted to the trunion of the crank 37 perpendicular to the radius of its rotation or in other words when lever arm of the crank has its maximum magnitude. The force is transmitted along a tangent to the circle along which the trunion 37 moves. As a result, there is a combination of the maximum pressure on the piston 2 and correspondingly maximum force on the traction rod 12 and as a result on the trunion 37, with the maximum lever arm of the crank 37. Therefore, again optimal conditions are created for producing maximal torque on the gear 17, which is transmitted to the gear 41 connected to the work shaft 13. Simultaneously with the expansion of hot gases in the chamber 39, air is compressed in the chamber 38 through the stock 9, traction rods 11 and 12, through the stock 10 by the piston 6. The gears 14, 15, 16, 17 have identical radii and are connected with the gear 43, and they rotate synchronously. At the end of the working stroke of the piston 2, the gear 17 with the trunion of the crank 37 turns by 90° as shown in FIG. 2, and as a whole from the beginning of work at the end of the fourth cycle all gears 14, 15, 16, 17 which turn synchronously; turn each by 360°. In other words, they perform a full revolution. The gears 40 and 41 connected with them and correspondingly the work shaft 13 turned by the angle which is as many times greater in other words perform as many revolutions, as the ratio of gears 14, 15, 16 and 17 is greater relative to the gears 40 and 41.

Since the connecting rods are composed of two parts which include a pushing connecting rod and a pulling connecting rod connected with one another by a hinge, therefore during a working stroke of one pair of the connecting rod 34, 35, the remaining connecting rods 21, 22, 24, 26, 29, 30 freely perform preparatory cycles. The connecting rods 21 and 22 connected with the trunion of the crank 18 turn together with the hinge 20 and tend to superpose in a single line. When all gears with the cranks simultaneously turned by 90°, the trunion of the crank 18 is located near the hinge 19 of the traction rod 11. The connecting rods 21 and 22 superpose in a single line and are located along one horizontal straight line as shown in FIG. 2. Therefore, favorable conditions are created for obtaining a maximal lever arm with the action of maximal force through the traction rod 11 on the hinge 19. Thereby when the gears 14, 15, 16, 17 complete the full revolution, the process starts from the cycle 1.

Optical mode of operation of the engine takes place therefore during each cycle, or in other words during each stroke of the piston. This means that in each one fourth revolution of the gears 14, 15, 16, 17 there is a combination of a maximum pressure of hot gas on the piston and simultaneously a maximum lever arm of the crank of a corresponding trunion, or in other words, a maximum torque on the work shaft is produced.

In the internal combustion engine in accordance with the present invention, in order to produce four working strokes during one revolution of the synchronously rotating gears/cranks, it is enough to provide only two cylinders. The working energy efficiency of the internal combustion engine is 65%.

The internal combustion engine in accordance with the present invention when compared with the internal combustion engine of my Letters Patent U.S. Pat. No. 5,537,957 filed on has a simpler construction, it has a smaller number of components and is simpler to assemble. Since low elements of the engine are located centrally, there are no side forces which can generate a turning moment, and therefore vibration of the engine is eliminated. While in my older patent U.S. Pat. No. 5,537,957 the four cranks are spaced from one another transversely, in the internal combustion engine in accordance with the present invention there are also four cranks; however, they are arranged in two pairs so that the cranks of each pair are located one above the other; and the pairs of the cranks are located transversely closer to one another and closer to the center line of the engine.

The internal combustion engine in accordance with the present invention also has all advantages of my internal combustion engine described in the above identified earlier patent application.

It will be understood that each of the elements described above, or two or more together, may also find a useful application in other types of constructions differing from the types described above.

While the invention has been illustrated and described as embodied in an internal combustion engine, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed and desired to be protected by Letters Patent is set forth in the appended claims:

1. An internal combustion engine, comprising a rotatable work shaft; a rotatable crank connected with said work shaft; a plurality of cylinders having working chambers; a plurality of pistons movable in said cylinders; and connecting means connecting said pistons with said crank so that a maximum compression pressure in said respective cylinders is transmitted to said crank and a maximum lever arm of said crank is simultaneously obtained, said crank includes at least two crank members located one above the other as viewed in a direction which is transverse to a longitudinal axis of the internal combustion engine.

2. An internal combustion engine as defined in claim 1, wherein said crank has four crank members arranged in two pairs so that said crank members of each pair are located one above the other and said pairs of said crank members are spaced from one another at both sides of the longitudinal axis of the internal combustion engine.

3. An internal combustion engine as defined in claim 1; and further comprising gears connecting said crank with said work shaft and formed as flywheels.

4. An internal combustion engine as defined in claim 3, wherein said gears include a driving gear and a driven gear arranged so that a torque of each of said driving gears is transmitted to said driven gears arranged on said working shaft.

5. An internal combustion engine as defined in claim 1, wherein said connecting means includes a pushing connecting rod and a pulling connecting rod connected with one another by a hinge.

6. An internal combustion engine as defined in claim 5, wherein said connecting means include a plurality of such pushing rods and pulling rods arranged so that when one pair of said connecting rods including one pushing rod and one pulling rod perform a working stroke, the remaining connecting rods freely perform preparatory cycles.

7. An internal combustion engine as defined in claim 5, wherein said connecting rods are formed so that each pair of said connecting rods perform a working stroke over each one fourth revolution of a driving gear to which a force is transmitted.

8. An internal combustion engine as defined in claim 5, wherein said pushing and said pulling gears are superposed during a working cycle located along a single line so that a maximum force is transmitted along a tangent to a circle along which a trunion of said crank moves.

* * * * *